(12) United States Patent
Zhang et al.

(10) Patent No.: US 11,247,724 B2
(45) Date of Patent: Feb. 15, 2022

(54) VEHICLE PARKING CONTROL

(71) Applicant: Ford Global Technologies, LLC, Dearborn, MI (US)

(72) Inventors: Linjun Zhang, Canton, MI (US); Lu Xu, Canton, MI (US); Codrin Cionca, Ann Arbor, MI (US); Juan Enrique Castorena Martinez, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/542,828

(22) Filed: Aug. 16, 2019

(65) Prior Publication Data

US 2021/0046977 A1    Feb. 18, 2021

(51) Int. Cl.
| | | |
|---|---|---|
| *B62D 15/02* | (2006.01) | |
| *B60W 30/06* | (2006.01) | |
| *G08G 1/16* | (2006.01) | |
| *B60W 10/20* | (2006.01) | |
| *B60W 10/18* | (2012.01) | |
| *B60W 40/04* | (2006.01) | |

(52) U.S. Cl.
CPC ....... *B62D 15/0285* (2013.01); *B60W 10/182* (2013.01); *B60W 10/20* (2013.01); *B60W 30/06* (2013.01); *B60W 40/04* (2013.01); *G08G 1/168* (2013.01); *B60R 2300/806* (2013.01); *B60T 2201/10* (2013.01); *B60W 2554/00* (2020.02)

(58) Field of Classification Search
CPC ... B62D 15/0285; B60W 30/06; B60W 10/20; B60W 10/182; B60W 40/04; B60W 2554/00; G08G 1/168; B60R 2300/806; B60T 2201/10
See application file for complete search history.

(56) References Cited

U.S. PATENT DOCUMENTS

| | | | |
|---|---|---|---|
| 8,498,813 B2 | 7/2013 | Oohashi et al. | |
| 9,915,538 B2 | 3/2018 | Fuehrer | |
| 2003/0150661 A1* | 8/2003 | Kataoka | B62D 15/029 180/204 |
| 2004/0267420 A1* | 12/2004 | Tanaka | B62D 15/0285 701/36 |
| 2005/0021203 A1* | 1/2005 | Iwazaki | B62D 15/0285 701/36 |
| 2008/0258935 A1* | 10/2008 | Lee | G07B 15/02 340/932.2 |
| 2010/0066515 A1* | 3/2010 | Shimazaki | G06T 7/73 340/435 |

(Continued)

FOREIGN PATENT DOCUMENTS

| | | | |
|---|---|---|---|
| CN | 109615927 A | 4/2019 | |
| DE | 102006062390 A1 * | 6/2008 | ......... B62D 15/0285 |

*Primary Examiner* — Jason Holloway
(74) *Attorney, Agent, or Firm* — Frank A. MacKenzie; Bejin Bieneman PLC

(57) ABSTRACT

A computer, including a processor and a memory, the memory including instructions to be executed by the processor to receive a vehicle path from a server computer and verify the vehicle path based on vehicle dynamics and vehicle constraints. The instruction can include further instructions to, when the vehicle path is verified as correct, operating the vehicle on the vehicle path and, when the vehicle path is verified as incorrect, stopping the vehicle.

20 Claims, 5 Drawing Sheets

(56) References Cited

U.S. PATENT DOCUMENTS

| | | | |
|---|---|---|---|
| 2010/0156672 A1* | 6/2010 | Yoo | G08G 1/14 340/932.2 |
| 2012/0179322 A1* | 7/2012 | Hennessy | G05D 1/0278 701/25 |
| 2013/0222157 A1* | 8/2013 | Fukushima | B60Q 9/002 340/932.2 |
| 2016/0371982 A1* | 12/2016 | Arndt | G08G 1/096811 |
| 2018/0039282 A1* | 2/2018 | Gupta | G06Q 10/0833 |
| 2018/0164817 A1* | 6/2018 | Herz | G05D 1/0212 |
| 2018/0348767 A1* | 12/2018 | Jafari Tafti | G08G 1/163 |
| 2019/0066003 A1 | 2/2019 | Dyer et al. | |

\* cited by examiner

VEHICLE PARKING CONTROL

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
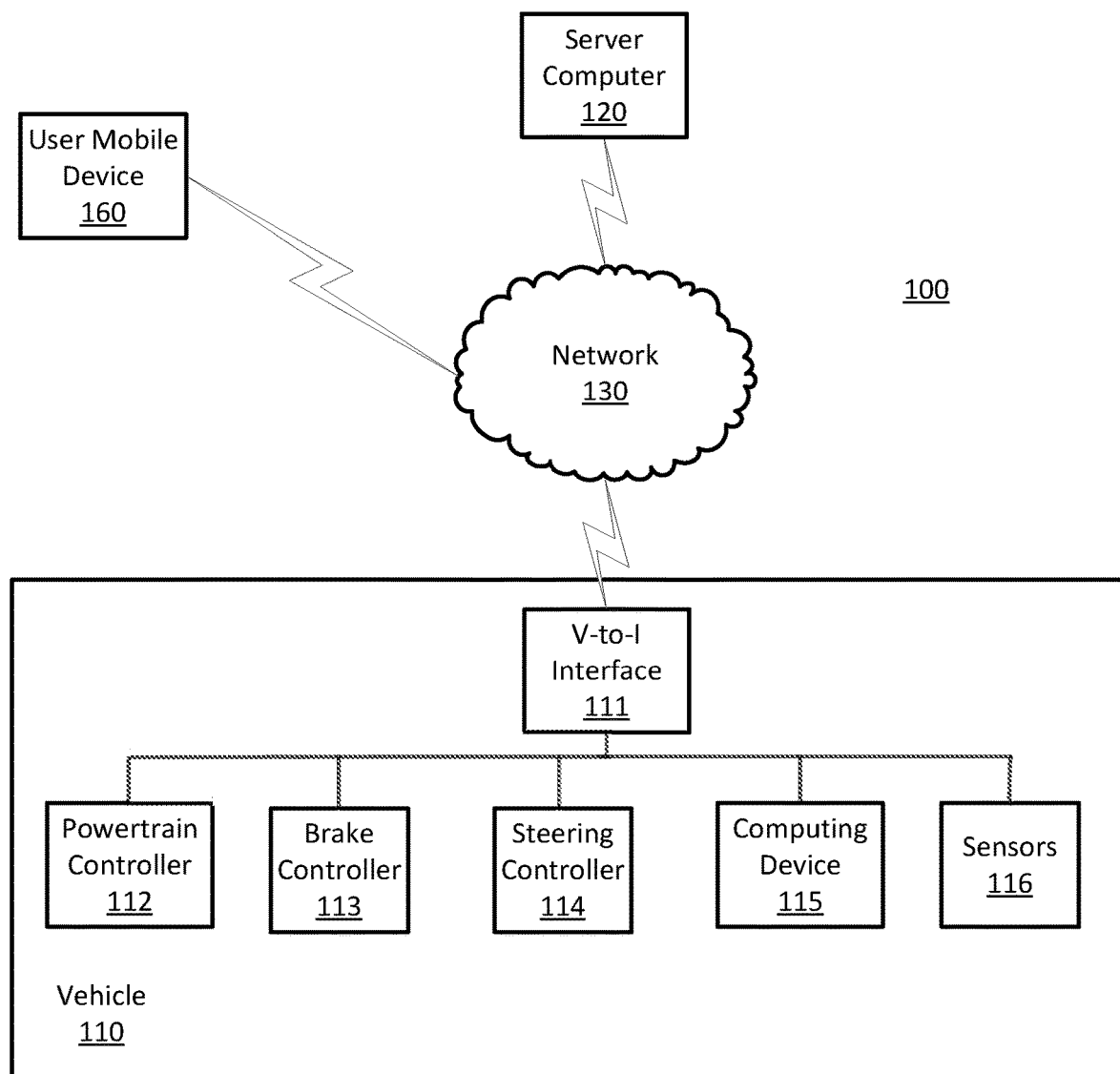
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

Operating the vehicle based on acquiring data regarding the external environment can depend upon acquiring the data using vehicle sensors. Vehicle sensors can include lidar sensors, radar sensors, and video sensors operating at one or more of visible light or infrared light frequency ranges. Vehicle sensor can also include one or more of a global positioning system (GPS), an inertial measurement unit (IMU) and wheel encoders. In examples of autonomous operation, a traffic infrastructure system can direct or assist the operation of a vehicle. For example, a traffic infrastructure system can be part of a parking structure or parking area and can be responsible for determining where a vehicle will be parked upon entering the structure or area. The traffic infrastructure system can be responsible for determining a route to be followed by the vehicle from the entrance to the parking spot and from the parking spot to the exit to control the efficient flow of traffic into and out of the structure or area.

Disclosed herein is method including receiving a vehicle path at a vehicle from a computer outside and remote from the vehicle and verifying the vehicle path based on vehicle dynamics including longitudinal, latitudinal and rotational motion of the vehicle and vehicle constraints, including objects included in an environment around the vehicle. When the vehicle path is verified as valid, operating the vehicle on the vehicle path and when the vehicle path is verified as invalid, stopping the vehicle. The vehicle path can be received at the vehicle when the vehicle enters a parking structure. A second vehicle path can be determined based on vehicle sensor data when the vehicle leaves the parking structure. Vehicle dynamics can be determined by calculating changes in longitudinal position, lateral position, and an angle of rotation in a plane defined by longitudinal and lateral axes. the vehicle path can be verified as incorrect by determining that one or more of the changes in longitudinal position, latitudinal position and angle of rotation exceed specified limits on longitudinal, latitudinal and angle of rotation changes, respectively.

The longitudinal position can be determined by an equation $x(k)=x(k-1)+TV(k-1)\cos\theta(k-1)$, wherein $x(k)$ is the longitudinal position at a time k, T is a time period and V is a velocity of the vehicle. The latitudinal position can be determined by an equation $y(k)=y(k-1)+TV(k-1)\sin\theta(k-1)$, wherein $y(k)$ is the latitudinal position at the time k, T is the time period and V is the velocity of the vehicle. The angle of rotation can be determined by the equation $$\theta(k) = \theta(k-1) + T\frac{V(k-1)\tan\delta(k-1)}{L},$$

wherein $\theta(k)$ is the angle of rotation at the time k, T is the time period, V is the velocity of the vehicle and L is the distance between the front and rear axles. The vehicle constraints can be determined by acquiring vehicle sensor data to determine objects in an environment around the vehicle including other vehicles and pedestrians. The vehicle path can be verified as incorrect by determining that the vehicle path will intersect a determined object or pass within specified lower limit of the determined object. When the vehicle path is verified as incorrect, requesting a retransmission of the vehicle path from a server computer and incrementing an error count. The vehicle can be stopped when the error count has been incremented to a specified error limit. The objects can include one or more of a pedestrian and a vehicle.

Further disclosed is a computer readable medium, storing program instructions for executing some or all of the above method steps. Further disclosed is a computer programmed for executing some or all of the above method steps, including a computer apparatus, programmed to receive a vehicle path at a vehicle from a computer outside and remote from the vehicle and verify the vehicle path based on vehicle dynamics including longitudinal, latitudinal and rotational motion of the vehicle and vehicle constraints, including objects included in an environment around the vehicle. When the vehicle path is verified as valid, operating the vehicle on the vehicle path and when the vehicle path is verified as invalid, stopping the vehicle. The vehicle path can be received at the vehicle when the vehicle enters a parking structure. A second vehicle path can be determined based on vehicle sensor data when the vehicle leaves the parking structure. Vehicle dynamics can be determined by calculating changes in longitudinal position, lateral position, and an angle of rotation in a plane defined by longitudinal and lateral axes. the vehicle path can be verified as incorrect by determining that one or more of the changes in longitudinal position, latitudinal position and angle of rotation exceed specified limits on longitudinal, latitudinal and angle of rotation changes, respectively.

The computer can be further programmed to determine the longitudinal position by an equation x(k)=x(k−1)+TV(k−1)cos θ(k−1), wherein x(k) is the longitudinal position at a time k, T is a time period and V is a velocity of the vehicle. The latitudinal position can be determined by an equation y(k)=y(k−1)+TV(k−1)sin θ(k−1), wherein y(k) is the latitudinal position at the time k, T is the time period and V is the velocity of the vehicle. The angle of rotation can be determined by the equation $$\theta(k) = \theta(k-1) + T\frac{V(k-1)\tan\delta(k-1)}{L},$$

wherein θ(k) is the angle of rotation at the time k, T is the time period, V is the velocity of the vehicle and L is the distance between the front and rear axles. The vehicle constraints can be determined by acquiring vehicle sensor data to determine objects in an environment around the vehicle including other vehicles and pedestrians. The vehicle path can be verified as incorrect by determining that the vehicle path will intersect a determined object or pass within specified lower limit of the determined object. When the vehicle path is verified as incorrect, requesting a re-transmission of the vehicle path from a server computer and incrementing an error count. The vehicle can be stopped when the error count has been incremented to a specified error limit. The objects can include one or more of a pedestrian and a vehicle.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
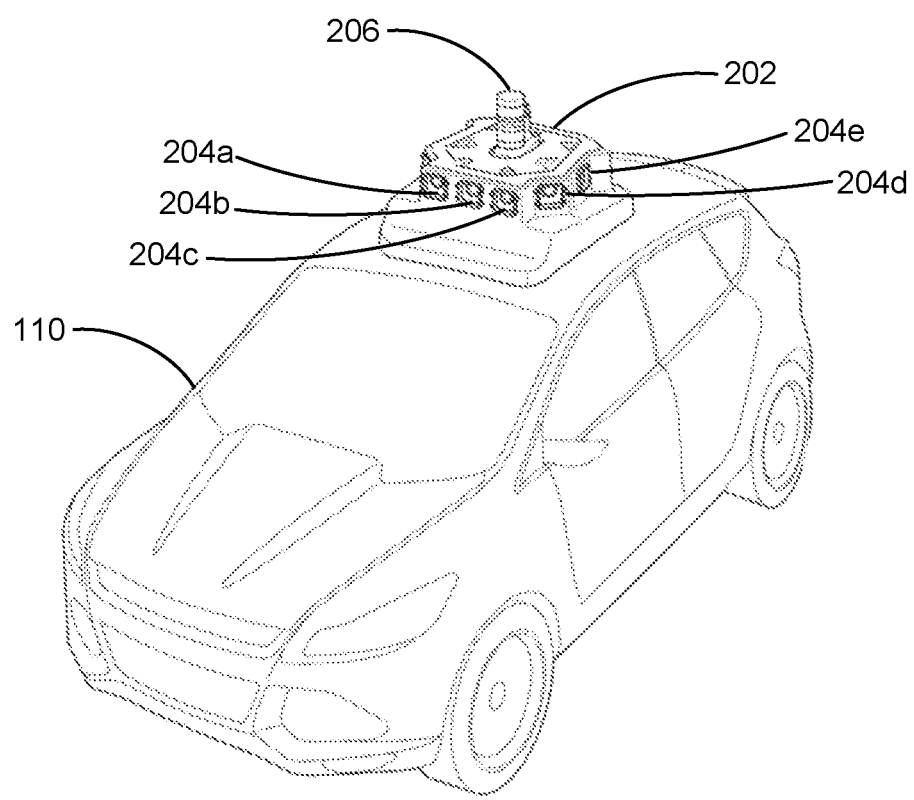
FIG. 2 is a diagram of an example vehicle including sensors.

FIG. 2 is a diagram of a vehicle 110 having a sensor housing 202. The sensor housing 202 typically and as illustrated includes video sensors 204a, 204b, 204c, 204d, and 204e (collectively video sensors 204), and a lidar sensor 206. Vehicle 110 can include a global positioning system (GPS) and an inertial measurement unit (IMU) that can determine vehicle 110 position with respect to an environment external to the vehicle 110. By acquiring and processing data from video and lidar sensors 204, 206, a GPS sensor and an IMU sensor, for example, a computing device 115 in a vehicle 110 can process the sensor data using machine vision techniques including deep neural networks to determine its location with respect to a roadway and roadway lanes and the locations of objects including other vehicles and pedestrians in the environment around the vehicle. By determining its location with respect to the environment and objects occurring in the environment, computing device 115 can determine a vehicle path upon which to operate vehicle 110 that reaches a destination while avoiding objects, where the destination can be a location on a roadway within the fields of view of lidar and video sensors 204, 206.

Figure 3:
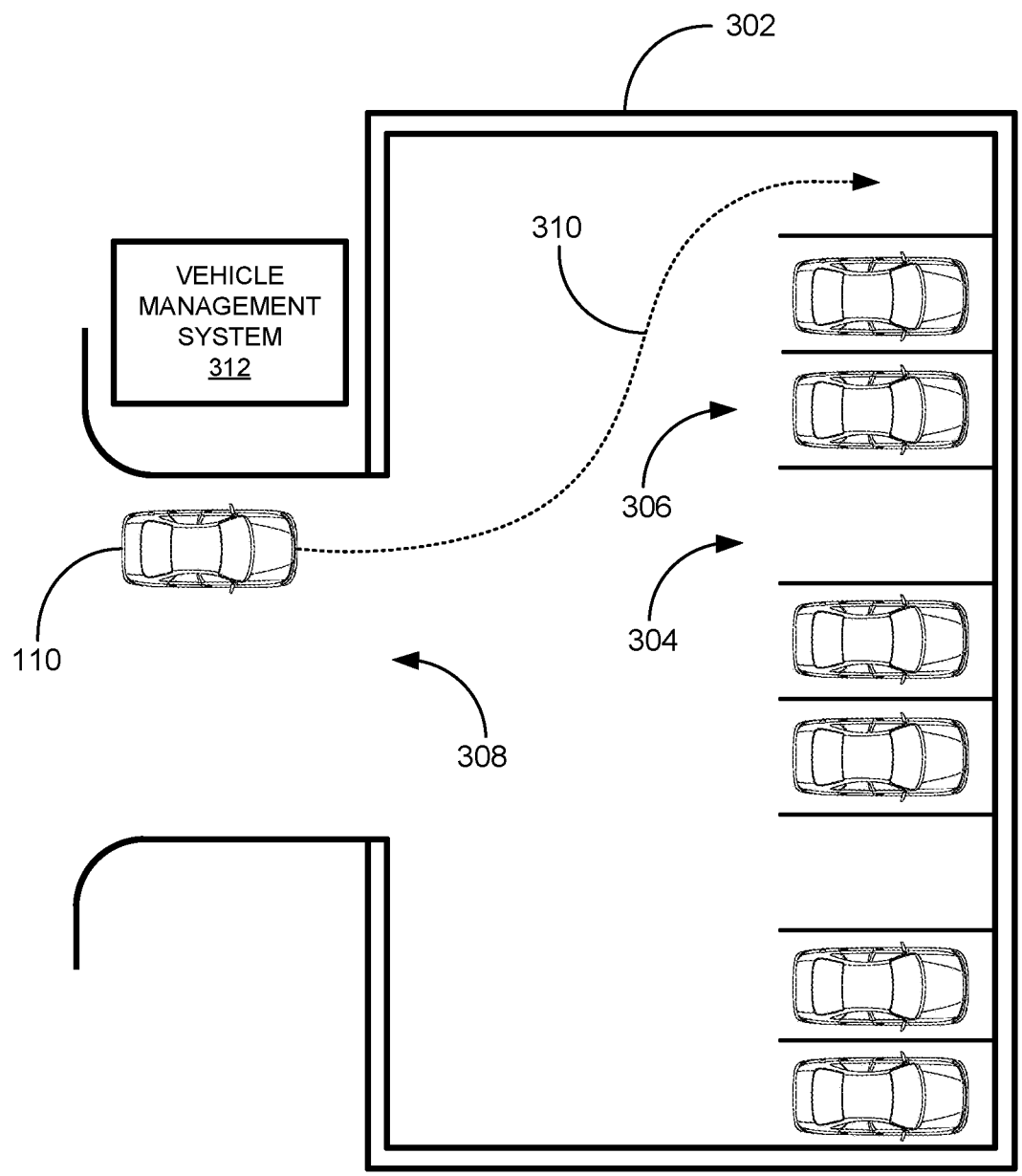
FIG. 3 is a diagram of an example parking structure.

FIG. 3 is a diagram of a traffic scene 300 including a parking structure 302, which may be a parking lot or parking garage. A parking structure 302 can include a plurality of parking spots 304, some of which are occupied by parked vehicles 306. A vehicle 110 can arrive at an entrance/exit 308 of the parking structure 302 with a plan to park in a parking spot 304 within the parking structure 302. Parking structure 302 can be equipped with a vehicle management system 312 to control vehicle 110 to park vehicle 110 in a parking spot 302. A vehicle management system 312 can include a plurality of computing devices, sensors and network interfaces that permit the vehicle management system 312 to acquire data regarding a vehicle 110 and objects, determine commands to be communicated to a vehicle 110, and communicate the commands to vehicles 110 via a network interface. Vehicle management system 312 can be part of a traffic infrastructure system 100 that includes computing devices, sensors and network interfaces distributed throughout roadways, parking structures 302 and other areas subject to vehicular traffic. Vehicle management system 312 can be configured to control vehicular traffic in a particular area such as a parking structure 302. In this example the vehicle management system 312 including computing devices, sensors and network interfaces can be mounted in or near the parking structure 302.

A vehicle management system 312 can be configured to control an area such as a parking structure 302, for example, and can communicate with vehicle 110 via a WI-FI network 130 or the like as described above in relation to FIG. 1. A WI-FI network 130 can be geo-fenced, where geo-fencing in this context means combining WI-FI network 130 coverage with location data regarding a vehicle 110 to permit vehicle management system 312 to only control a vehicle 110 in a permitted area, in this example within the parking structure 302 and at the entrance/exit 308. WI-FI network 130 coverage is defined as an area within which a V-to-I interface 111 can reliably transmit and receive messages to and from a vehicle management system 312. Vehicle management system 312 can also communicate with a vehicle 110 via cellular networks or DSRC networks as discussed above in relation to FIG. 1.

Vehicle management system 312 can receive and identify data describing parking spot 304 locations and parked vehicles 306 and can use the data to determine a vehicle path 310 (dotted line) that can be used to operate vehicle 110 from an entrance/exit 308 location to an unoccupied parking spot 304. Vehicle management system 312 can acquire data regarding unoccupied parking spot 304 locations and the locations of objects that may occur in the parking structure 302 using video cameras, for example. Vehicle management system 312 can combine the acquired video data in a computing device with data received from vehicles via a network 130 or other sensors such as lidar sensors, radar sensors or magnetic sensors that detect the presence/absence of metallic objects like vehicles or motorcycles. For example, vehicle management system 312 can acquire video images from video sensors installed in the parking structure 302 so that the entire area of the parking structure 302 is viewed by at least one video camera. The video images can be acquired when the parking structure is determined to be empty. A computing device included in the vehicle management system 312 can periodically acquire new video images from the video cameras installed in the parking structure 302 and subtract the previously acquired video images from corresponding new video images to determine the presence of objects, including vehicles, pedestrians or bicycles, for example, in the parking structure 302.

A computing device included in the vehicle management system 312 can acquire data regarding vehicles and objects in a parking structure 302 and determine a vehicle path 310 for a vehicle 110 to follow based on analyzing the acquired data with a computing device. A vehicle path 310 is a polynomial function that includes a series of n connected points in the X, Y plane that includes predicted vehicle 110 trajectories at n future time steps. The n connected points are determined by a polynomial function in the X, Y plane, where the X, Y axes are determined by the direction of vehicle 110, with the X direction being parallel to the direction of travel and the Y direction being perpendicular to the direction of travel, for example. Chebyshev's theorem states that n points can be represented exactly by a polynomial of degree (n−1). In this case n points, where n can be a large number, greater than 100 for example, can be represented by a polynomial of degree k, where, in this case, k can be a number less than or equal to 3, for example. The n connected points in a vehicle path 310 polynomial can be represented by a polynomial function in X and Y of degree k or less. For example, a steerable path polynomial 214 can represent 10 seconds of elapsed time and can be sampled at 100 milliseconds/sample or 10 Hz to yield n=100 sample points. In this example, the n=100 sample points in vehicle path 310 polynomial can be represented by a polynomial function in X and Y of degree 3 or less.

The polynomial function in X and Y of degree k or less that represent the vehicle path 310 polynomial can include one or more Bezier curves. Bezier curves are polynomial functions of degree k or less that each represent a disjoint subset of the n points, and that taken together, represent the entire set of n points. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a vehicle path 310 polynomial a steerable path polynomial by limiting the rates of longitudinal and lateral accelerations required to pilot a vehicle along the vehicle path 310 polynomial, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the vehicle path 310 polynomial can be constrained to provide a vehicle path 310 can be operated upon by vehicle 110 without exceeding limits on lateral and longitudinal accelerations.

Vehicle management system 312 can direct the operation of a vehicle 110 within a parking structure 302 which is advantageous because, in examples where a parking structure 302 has more than one level or is inside of a building, GPS signals that can be used for vehicle 110 localization are typically not available. Further, GPS signals typically do not provide localization of a vehicle with sufficient accuracy or a sufficient level of precision; parking spot 304 size can require localization (i.e., determining a location of a vehicle) that is more accurate than typically required or available for operation of a vehicle. In operation on a roadway, vehicle location to with a few centimeters can be sufficient to successfully locate a vehicle 110 in a lane on a roadway. Parking can require vehicle localization of a centimeter or less to successfully park a vehicle 110 in a parking spot 304. Advantageously, the vehicle management system 312 can provide such localization precision in a parking structure 302. Vehicle management system 312 can transmit data regarding a vehicle path 310 to a vehicle 110 using WI-FI as discussed above. A computing device 115 in vehicle 110 can operate vehicle 110 to travel along vehicle path 310 by controlling vehicle powertrain, steering and brakes via controllers 112, 113, 114 and cause vehicle 110 to travel from an entrance/exit 308 to an unoccupied parking spot 304.

Unparking a vehicle 110 from a parking spot 304 includes reversing the process of parking the vehicle 110 described above. To unpark a vehicle 110 a vehicle management system 312 can determine a vehicle path 310 that operates the vehicle 110 from the parking spot 304 to an entrance/exit 308 while ensuring that the vehicle 110 is oriented (i.e., facing in a direction) to be able to exit the parking structure 302 by operating in a forward direction, for example. The vehicle management system 312 can also move a vehicle 110 from one parking spot 304 to another parking spot 304 while the vehicle 110 is parked in the parking structure 302, for example to move a vehicle 110 from long-term parking to short-term parking in expectation that the vehicle will be soon unparked from the parking structure 302.

Figure 4:
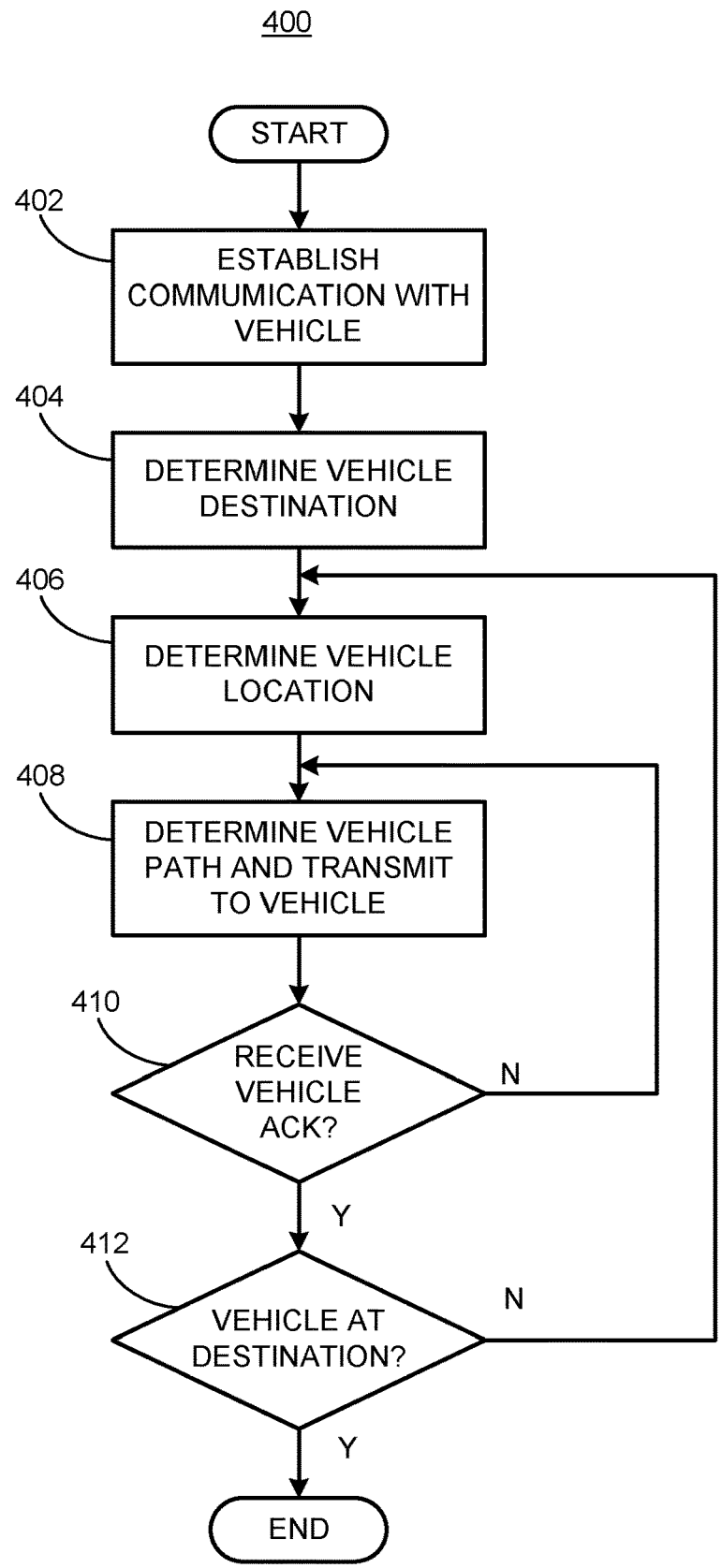
FIG. 4 is a flowchart diagram of an example process to direct operation of a vehicle to a destination.

FIG. 4 is a diagram of a flowchart, described in relation to FIGS. 1-3, of a process 400 for directing a vehicle 110 to park in a parking structure 302. Process 400 can be implemented by a processor of a computing device included in a vehicle management system 312, taking as input data from sensors, and executing commands, and outputting object data, for example. Process 400 includes multiple blocks that can be executed in the illustrated order. Process 400 could alternatively or additionally include fewer blocks or can include the blocks executed in different orders.

Process 400 begins at block 402, where a computing device in vehicle management system 312, determines that a vehicle 110 is at an entrance/exit 308 of a parking structure 302 and is thereby within the geofence corresponding to the parking structure 302. A computing device included in the vehicle management system 312 can determine the presence of objects including vehicles, pedestrians and bicycles as discussed above in relation to FIG. 3, for example, and determine a vehicle path 310 that will permit a vehicle 110 to travel to an empty parking spot 304 while avoiding objects and maintaining limits on lateral and longitudinal accelerations. Vehicle management system 312 can initiate Wi-F communication with the vehicle 110 to establish a plan by the vehicle 110 to park in the parking structure 302 and the ability of the vehicle 110 to execute commands to follow a vehicle path determined by the vehicle management system 312. The WI-FI communication is necessarily two-way with messages sent from the vehicle management system 312 and appropriate responses received from the vehicle 110 to insure the plan and capabilities of the vehicle 110.

At block 404 the vehicle management system 312 determines a destination location, i.e., a parking spot 304 for the vehicle 110. The parking spot 304 can be determined based on the size and maneuverability of the vehicle 110, i.e. large trucks vs. sub-compact vehicles, for example. The vehicle management system 312 can simulate the operation of a vehicle 110 using simulation software that models the operation of a vehicle 110 in a software model of a parking structure 302 with accuracy sufficient to determine whether a vehicle 110 can travel a vehicle path within the parking structure 302 without contacting portions of the parking structure 302 or other vehicles and objects. The parking spot 304 can also be determined based on an estimate of how long the vehicle expects to be parked. For example, the vehicle management system 312 can send a message to an incoming vehicle 110 inquiring as to how long the vehicle 110 expects to be parked. In examples where the vehicle 110 does not expect to be used again for a long period, for example overnight, the vehicle 110 can be parked behind other vehicles that expect to be retrieved at an earlier time, thereby saving space in the parking structure 302.

At block 406 the vehicle management system 312 determines localization data for the vehicle 110 including an x, y location and orientation θ. This localization data can be in global coordinates, where the x, y location is measured with respect to x and y latitude and longitude axes and orientation θ is measured with respect to x and y axes. The localization data can be received from a computing device 115 included in vehicle 110 and from sensors included in the vehicle management system 312 as discussed above in relation to FIG. 3.

At block 408 the vehicle management system 312 determines a vehicle path 310 to direct the vehicle 110 from its current location to the destination location. The vehicle management system 312 can transmit the vehicle path 310 data to the vehicle 110 with accompanying instructions regarding a time period within which the vehicle path 310 is valid. At block 410 the vehicle management system 312 receives a response from the vehicle 110 acknowledging that the vehicle 110 has received the vehicle path 310 and accompanying instructions and is prepared to comply, i.e., to operate the vehicle along the vehicle path 310 according to the instructions. If the traffic infrastructure system receives the acknowledgment, process 400 passes to block 412. If the vehicle management system 312 receives a NAK, or negative acknowledgement, meaning that the vehicle 110 is not intending to comply with the instructions, or does not receive any response within a small number of seconds (<10 seconds), process 400 branches back to block 408 and the vehicle path 310 and instructions are re-transmitted.

At block 412 vehicle management system 312 transmits a request for data to vehicle 110 as the vehicle 110 travels on vehicle path 310. Vehicle management system 312 can receive an acknowledgement from vehicle 110 that the vehicle has arrived and the determined destination, for example a parking spot 304 and has successfully parked. When Vehicle management system 312 receives this acknowledgement, process 400 ends. When vehicle management system 312 receives a message from vehicle 110 stating that the vehicle has not successfully reached the determined destination, or when vehicle management system 312 does not receive a response from the vehicle 110 in a few (<10) seconds, process 400 loops back to block 406, where vehicle management system 312 can again determine the vehicle 110 location and determine a new vehicle path 310.

Techniques described herein improve vehicle management system 312 assisted parking by using a computing device 115 included in a vehicle 110 and vehicle sensors 116 to verify a vehicle management system 312 vehicle path 310 and instructions while vehicle 110 is operating on the vehicle path 310. For example, signals corresponding to vehicle path 310 and instructions from a vehicle management system 312 can be corrupt as a result of signal noise or malicious intent. Computing device 115 can verify a vehicle path 310 based on vehicle dynamics and vehicle constraints to avoid causing a vehicle 110 to attempt to follow a vehicle path that can cause the vehicle 110 to exceed limits on vehicle lateral or longitudinal acceleration, speed or turning radius or cause the vehicle 110 to come into contact with objects in the environment around the vehicle. Following a vehicle path 310 can cause a vehicle 110 to contact an object when the position of an object is moving, such as when a pedestrian or a vehicle is moving and changes position from a time at which the vehicle management system 312 determines the vehicle path 310 and the time at which the vehicle 110 attempts to operate along the vehicle path 310. Vehicle dynamics are defined by limits on vehicle speed and turning rate determined by limits on changes in longitudinal position, latitudinal position and angle of rotation of the vehicle 110 per unit time. Vehicle dynamics and vehicle constraints are determined by calculating vehicle motion values based on vehicle path 310 and vehicle management system 312 instructions, and data regarding objects in an environment around a vehicle 110 determined based on vehicle sensor data.

Vehicle dynamics can be used by a computing device 115 in a vehicle 110 to verify the fidelity of localization data received from a vehicle management system 312. Vehicle dynamics are defined as longitudinal, latitudinal and rotational motion of the vehicle. Vehicle path 310 data received from a vehicle management system 312 includes vehicle location and orientation data as x and y location coordinates and θ orientation measured with respect to a global coordinate system such as latitude and longitude, where orientation is defined as an angle of rotation in a plane defined by the longitudinal and latitudinal (x,y) axes. Assume that x(k), y(k), and θ(k) are latitudinal, longitudinal and orientation (angle of rotation) measurements received by a vehicle 110 at time $t_k$. A computing device 115 in a vehicle 110 can determine an estimate of its own position based on vehicle dynamics and a previous location at time $t_{k-1}$ at low velocities (<15 kilometers/hour) based on the equations:

$$x(k) = x(k-1) + TV(k-1)\cos\theta(k-1) \quad (1)$$

$$y(k) = y(k-1) + TV(k-1)\sin\theta(k-1) \quad (2)$$

$$\theta(k) = \theta(k-1) + T\frac{V(k-1)\tan\delta(k-1)}{L} \quad (3)$$

where T is the sample rate, V is the vehicle velocity, δ is the front wheel steering angle and L is the distance between the front and rear axles of the vehicle 110. Given previous localization data x(k−1), y(k−1), and θ(k−1), equations (1)-(3) can estimate current localization $\hat{x}(k)$, $\hat{y}(k)$, and $\hat{\theta}(k)$. Current location and orientation errors can be determined by:

$$e_p = \sqrt{(x-\hat{x})^2 + (y-\hat{y})^2} \qquad (4)$$

$$e_h = |\theta - \hat{\theta}| \qquad (5)$$

where $e_p$ is the location error and $e_h$ is the orientation error. If $e_p$ or $e_h$ is greater than a threshold, the localization data from the traffic infrastructure system is determined to be in error.

A vehicle path 310 and instructions received by a vehicle 110 can also be verified against vehicle constraints. The vehicle path 310 can be expressed as a path polynomial, where the vehicle path 310 can be described mathematically as a series of joined polynomial functions of degree three or less. The vehicle path 310 can be checked by a computing device 115 included in a vehicle 110 to verify that the vehicle path 310 is clear of objects and that the maximum curvature of the path is within the capabilities of the vehicle 110. Path curvature is defined by the rate of change in direction of the path per unit distance, for example radians per meter. The maximum curvature of the vehicle path 310 must be smaller than a specified threshold for a vehicle 110. For example, the maximum curvature of the vehicle path 310 can be specified to be smaller than 0.3 rad/meter, i.e., the minimum turning radius is about 33 meters. Another way to express this is to require that heading changes between two consecutive location updates be within 0.1 radians. The vehicle 110 can determine locations of objects in an environment around the vehicle 110 based on acquiring sensor 116 data and processing the data using machine vision techniques, for example using deep neural networks, to identify and locate objects such as pedestrians and vehicles. The received vehicle path 310 can be checked to ensure that following the vehicle path 310 will not cause the vehicle to contact or intersect a determined object or come within a threshold distance or specified lower limit of a determined object, for example 0.3 meters by simulating the operation of the vehicle 110 using simulation software. The simulation software can move a model of vehicle 110 that includes the size and shape of the vehicle 110 along the received vehicle path according to the receive instructions while checking for intersections between the vehicle model, portions of the parking structure 302 and models of other vehicles and objects included in the simulation. In examples where following the received vehicle path 310 would cause the vehicle to contact the objects or come within a threshold distance, the vehicle path 310 is determined to be invalid.

Figure 5:
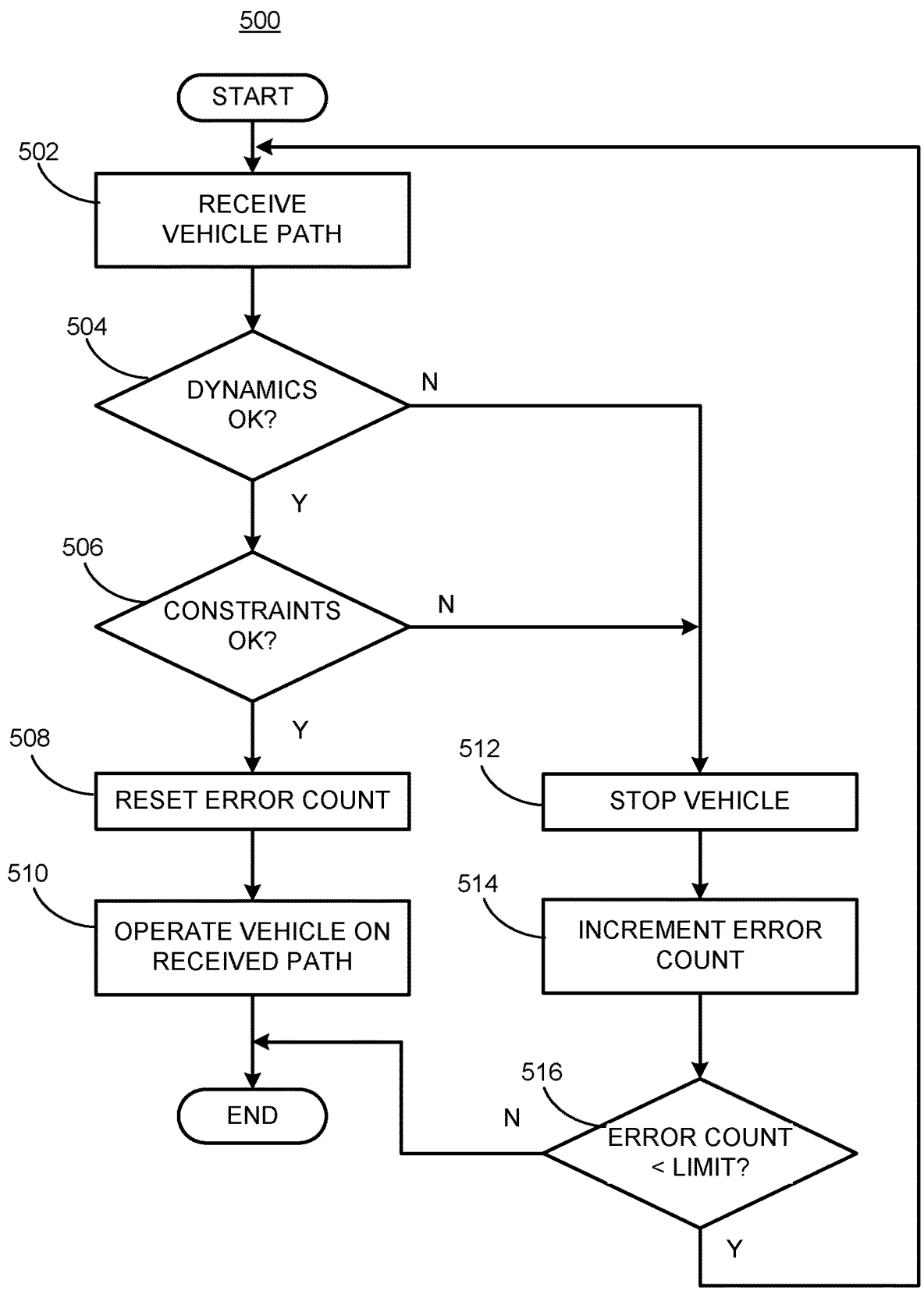
FIG. 5 is a flowchart diagram of an example process to operate a vehicle to a destination.

FIG. 5 is a diagram of a flowchart, described in relation to FIGS. 1-4, of a process 500 for verifying a vehicle path 310. Process 500 can be implemented by a processor of computing device 115, taking as input data from sensors, and executing commands, and outputting object data, for example. Process 500 includes multiple blocks that can be executed in the illustrated order. Process 500 could alternatively or additionally include fewer blocks or can include the blocks executed in different orders.

Process 500 begins at block 502, where a computing device 115 in a vehicle 110 receives a vehicle path 310 and instructions from a vehicle management system 312. As discussed above, the vehicle 110 is being directed to a destination within a parking structure 302.

At block 504 computing device 115 determines whether the vehicle path 310 is verified with respect to vehicle dynamics by calculating equations (1)-(5) to determine location error $e_p$ and orientation error $e_h$. If the either of the error terms are greater than a threshold, process 500 branches to block 512. If the error terms are both less than the thresholds, process 500 branches to block 506.

At block 506 computing device 115 determines whether the vehicle path 310 is verified with respect to vehicle constraints by determining the turning radius required by the vehicle path 310 and determining that the vehicle path 310 is clear of objects determined based on vehicle sensor data. If the turning radius is greater than the threshold or the vehicle path 310 causes the vehicle to contact or nearly contact any objects, process 500 branches to block 512. If the turning radius is less that the threshold and the vehicle path 310 is clear of objects, process 500 branches to block 510.

At block 508 the computing device 115 resets the error count to zero to indicate that the current vehicle path 310 has been determined to be able to be followed by the vehicle 110 and is therefore valid. Resetting the error count to zero prepares process 500 to receive a next vehicle path 310.

At block 510 the computing device 115 commands vehicle powertrain, steering and brakes via controllers 112, 113, 114 to follow vehicle path 310 according to received instructions regarding vehicle speed. Following block 510 process 500 ends.

At block 512 computing device 115 commands vehicle powertrain and brakes via controllers 112, 114 to stop vehicle 110 when the error count has been incremented to a specified error limit, for example an error count greater than or equal to 10. This indicates that the received vehicle path 310 cannot be followed by the vehicle 110 and the received vehicle path 310 is therefore invalid. At this point the vehicle 110 must stop until a valid vehicle path 310 is received.

At block 514 computing device 115 increments the error count.

At block 516 computing device checks the error count against a user determined limit, for example 10. If the error count is less than the limit, the process sends a request to the vehicle management system 312 for a re-transmission of a vehicle path 310 and branches back to block 502 to receive the new vehicle path 310. If the error count is greater than the limit the computing device 115 sends a message to the vehicle management system 312 indicating that the error count has been exceeded and process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
receive at a vehicle, from a computer outside and remote from the vehicle a vehicle path represented by a polynomial function that includes vehicle location and orientation data;
verify the vehicle path based on (a) location and orientation errors with respect to vehicle dynamics including the vehicle location and orientation data included in the polynomial function, and (b) vehicle constraints including a path curvature and whether the path is clear of objects included in an environment around the vehicle;
based on determining in the processor that the vehicle path is verified as valid, operate the vehicle on the vehicle path; and
based on determining in the processor that the vehicle path is verified as invalid, stop the vehicle.

2. The computer of claim 1, the instructions further including instructions to receive the vehicle path at the vehicle when the vehicle enters a parking structure.

3. The computer of claim 2, the instructions further including instructions to determine a second vehicle path based on vehicle sensor data when the vehicle leaves the parking structure.

4. The computer of claim 1, the instructions further including instructions to determine vehicle dynamics by calculating changes in longitudinal position, lateral position, and an angle of rotation in a plane defined by longitudinal and lateral axes.

5. The computer of claim 4, the instructions further including instructions to verify the vehicle path is incorrect by determining that one or more of the changes in longitudinal position, latitudinal position and angle of rotation exceed specified limits on longitudinal, latitudinal and angle of rotation changes, respectively.

6. The computer of claim 1, the instructions further including instructions to determine the vehicle constraints by acquiring vehicle sensor data to determine objects in an environment around the vehicle including other vehicles and pedestrians.

7. The computer of claim 6, the instructions further including instructions to verify the vehicle path is incorrect by determining that the vehicle path will intersect a determined object or pass within a specified lower limit of the determined object.

8. The computer of claim 1, the instructions further including instructions to, when the vehicle path is verified as incorrect, requesting a re-transmission of the vehicle path from a server computer and increment an error count.

9. The computer of claim 8, the instructions further including instructions to stop the vehicle when the error count has been incremented to a specified error limit.

10. The computer of claim 1, the instructions further including instructions to, when the vehicle path is verified as correct, operate the vehicle by controlling vehicle powertrain, vehicle steering and vehicle braking to cause the vehicle to travel on the vehicle path.

11. A method, comprising:
receiving at a vehicle, from a computer outside and remote from the vehicle a vehicle path represented by a polynomial function that includes vehicle location and orientation data;
verifying the vehicle path based on (a) location and orientation errors with respect to vehicle dynamics including the vehicle location and orientation data included in the polynomial function, and (b) vehicle constraints including a path curvature and whether the path is clear of objects included in an environment around the vehicle;
based on determining in a processor that the vehicle path is verified as valid, operating the vehicle on the vehicle path; and
based on determining in the processor that the vehicle path is verified as invalid, stopping the vehicle.

12. The method of claim 11, further comprising receiving the vehicle path at the vehicle when the vehicle enters a parking structure.

13. The method of claim 12, further comprising determining a second vehicle path based on vehicle sensor data when the vehicle leaves the parking structure.

14. The method of claim 11, further comprising determining vehicle dynamics by calculating changes in longitudinal position, lateral position, and an angle of rotation in a plane defined by longitudinal and lateral axes.

15. The method of claim 14, further comprising verifying the vehicle path is incorrect by determining that one or more of the changes in longitudinal position, latitudinal position and angle of rotation exceed specified limits on longitudinal, latitudinal and angle of rotation changes, respectively.

16. The method of claim 11, further comprising determining the vehicle constraints by acquiring vehicle sensor data to determine objects in an environment around the vehicle including other vehicles and pedestrians.

17. The method of claim 16, further comprising verifying the vehicle path is incorrect by determining that the vehicle path will intersect a determined object or pass within specified lower limit of the determined object.

18. The method of claim 11, further comprising, when the vehicle path is verified as incorrect, requesting a re-transmission of the vehicle path from a server computer and incrementing an error count.

19. The method of claim 18, further comprising stopping the vehicle when the error count has been incremented to a specified error limit.

20. The method of claim 11, further comprising, when the vehicle path is verified as correct, operating the vehicle by controlling vehicle powertrain, vehicle steering and vehicle braking to cause the vehicle to travel on the vehicle path.

* * * * *